United States Patent [19]

Bowitz

[11] Patent Number: 5,076,228
[45] Date of Patent: Dec. 31, 1991

[54] ROTARY VANE ENGINE

[76] Inventor: Harlan Bowitz, 113 Christensen Dr., Placentia, Calif. 92670

[21] Appl. No.: 862,298

[22] Filed: May 12, 1986

[51] Int. Cl.$^5$ .......................................... F02B 53/04
[52] U.S. Cl. .................................................. 123/236
[58] Field of Search ................................ 123/243, 236

[56]   References Cited
U.S. PATENT DOCUMENTS

| | | | |
|---|---|---|---|
| 3,176,665 | 4/1965 | Macarrulla | 123/243 |
| 3,726,259 | 4/1973 | Graves | 123/236 |
| 4,638,776 | 1/1987 | Crittenden | 123/236 X |

Primary Examiner—Stephen F. Husar

[57] ABSTRACT

A rotary van engine composed of less parts than previous types. Rotors turn unidirectionally, and fire similar to a reciprocating four cylinder 4 cycle in line upright or inverted piston engine. In front section, induction and compression occurs with transfer of charge in volumetric crescented chamber when vane in rotor sweeps through first revolution completing two cycles. In rear section, combustion and exhaustion occurs from transfer of charge in volumetric crescented chamber when vane in rotor sweeps through second revolution completing two more cycles, for a total of four cycles in two revolutions. The center plate is stationary including adjacent coupling, case and flange parts to become a monolithic entity. A single engine block, the center plate has fuel air transfer slots and port allowing opening for charge to pass between front and rear sections. This is done in conjunction with and by cross connection of front vane's open valving feature after compression and by cross connection of rear vane's closed valving feature before combustion, among other integral attributes.

4 Claims, 9 Drawing Sheets

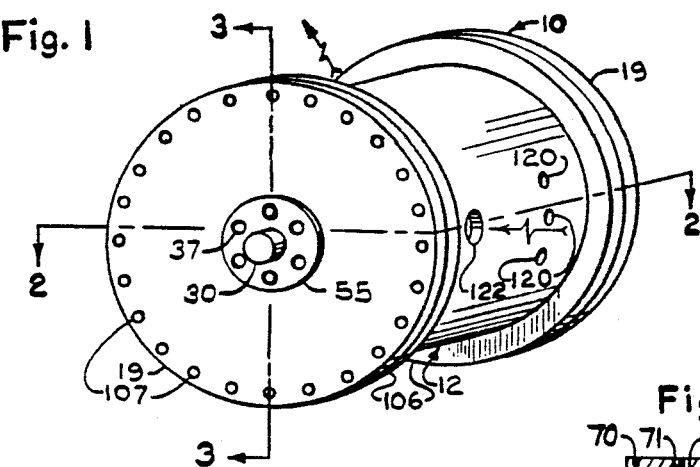
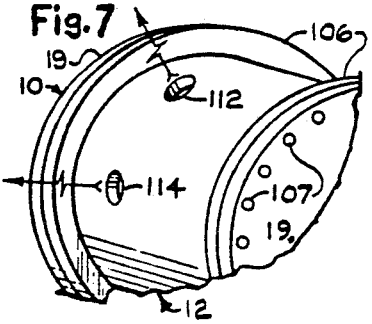
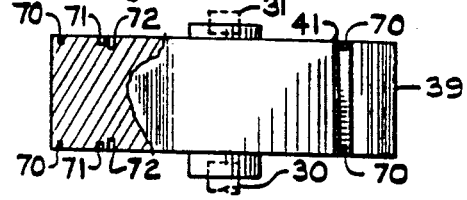
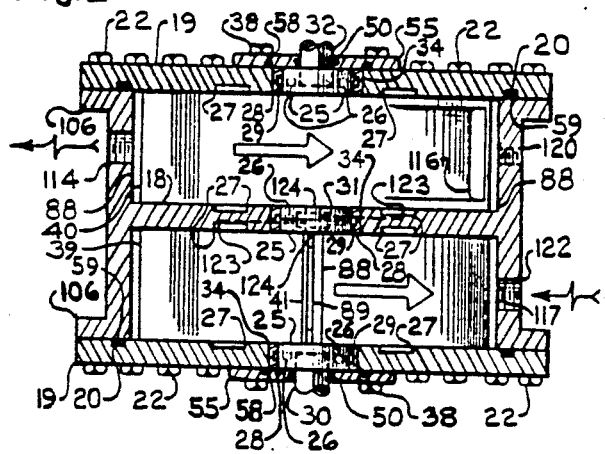
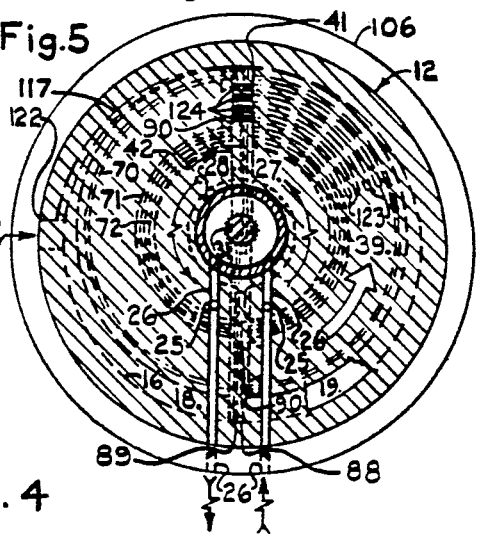
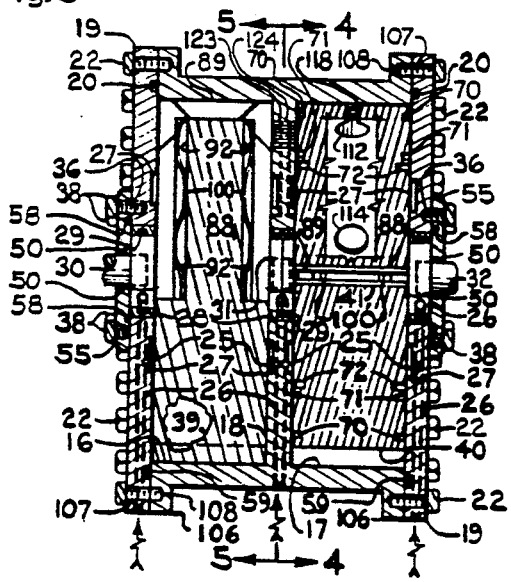
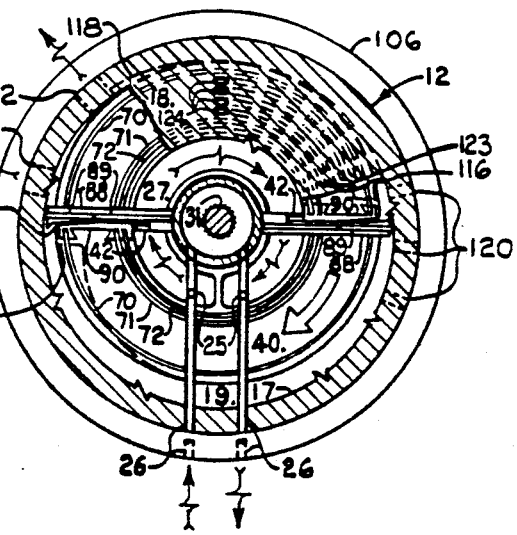

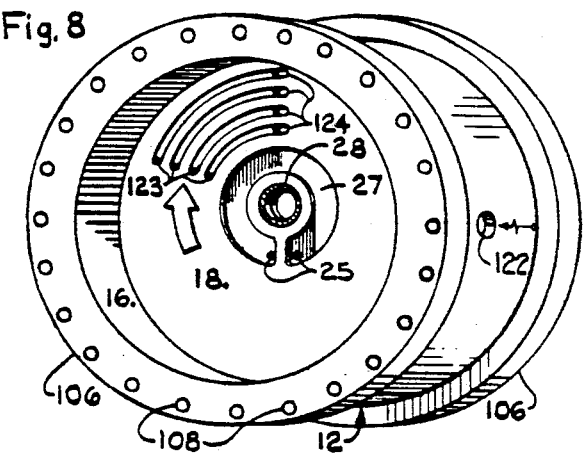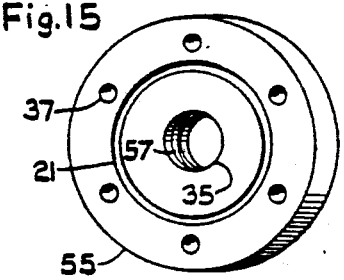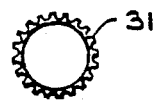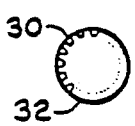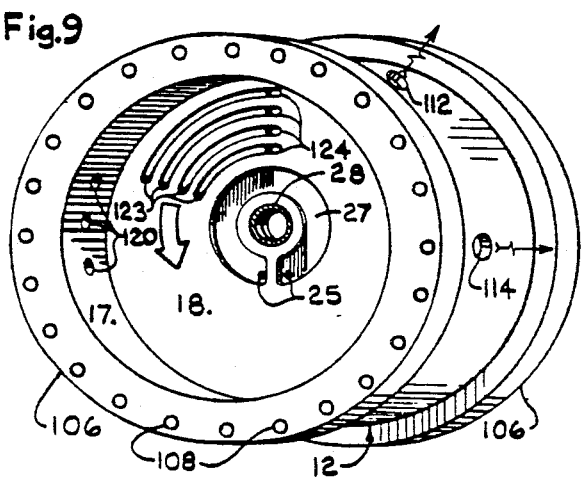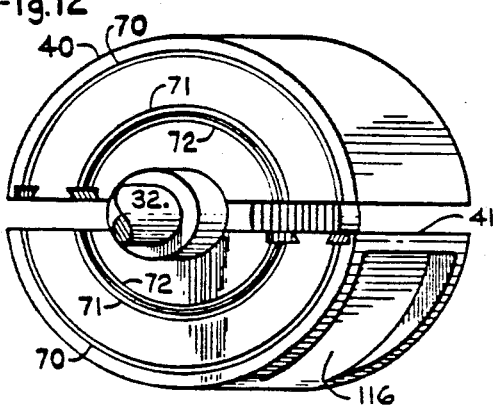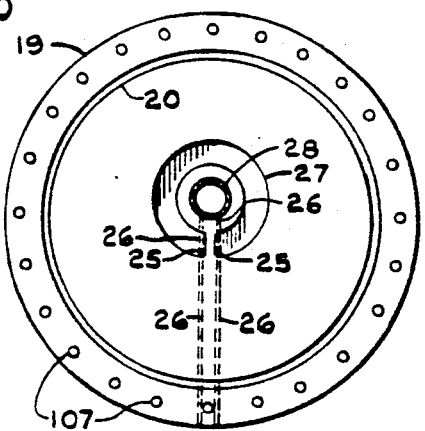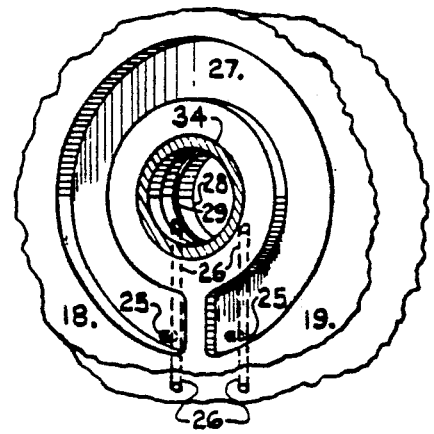

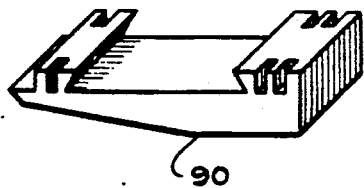
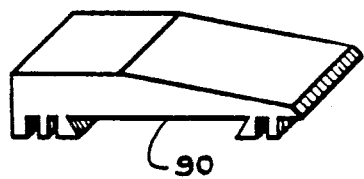
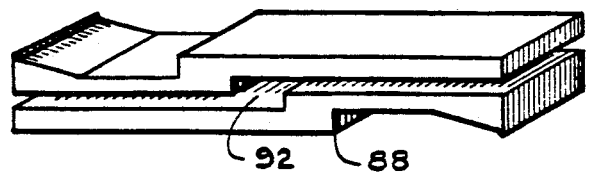
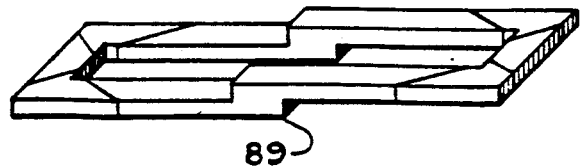
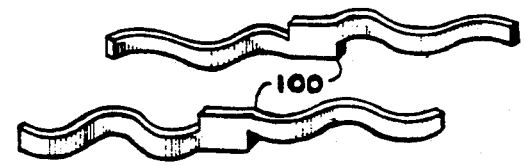
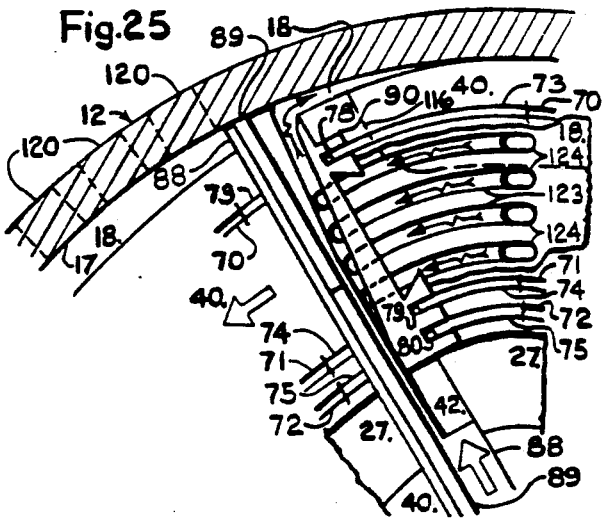
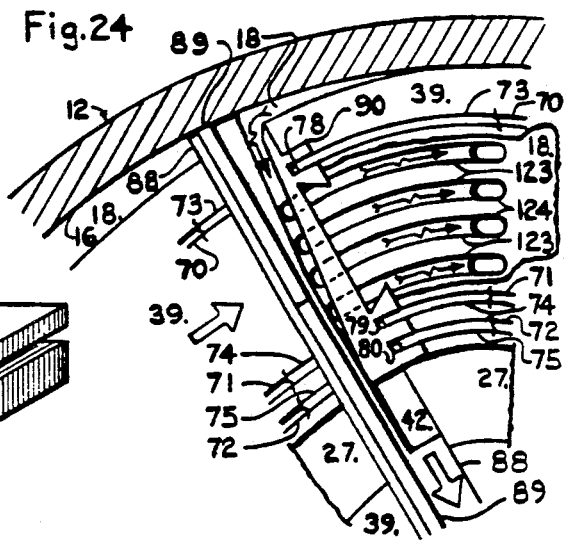
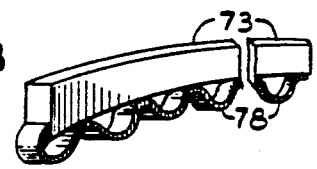
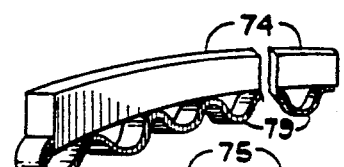
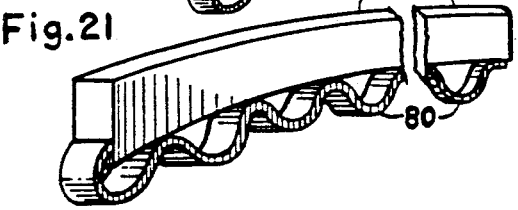

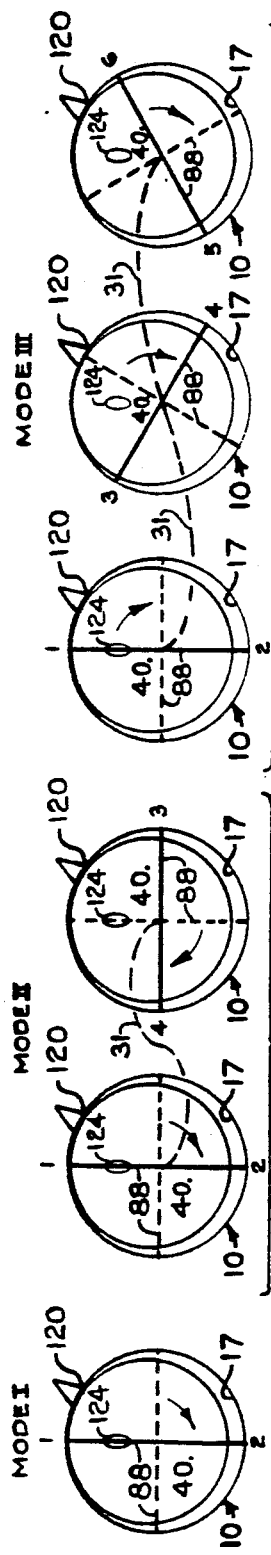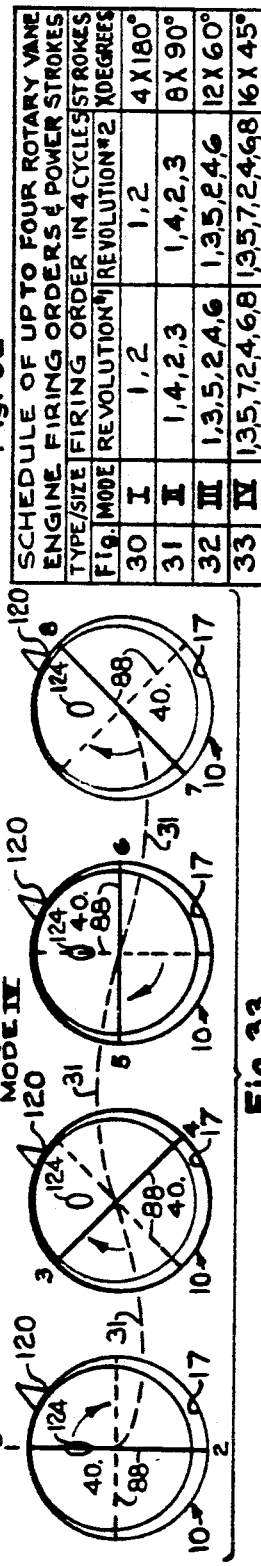

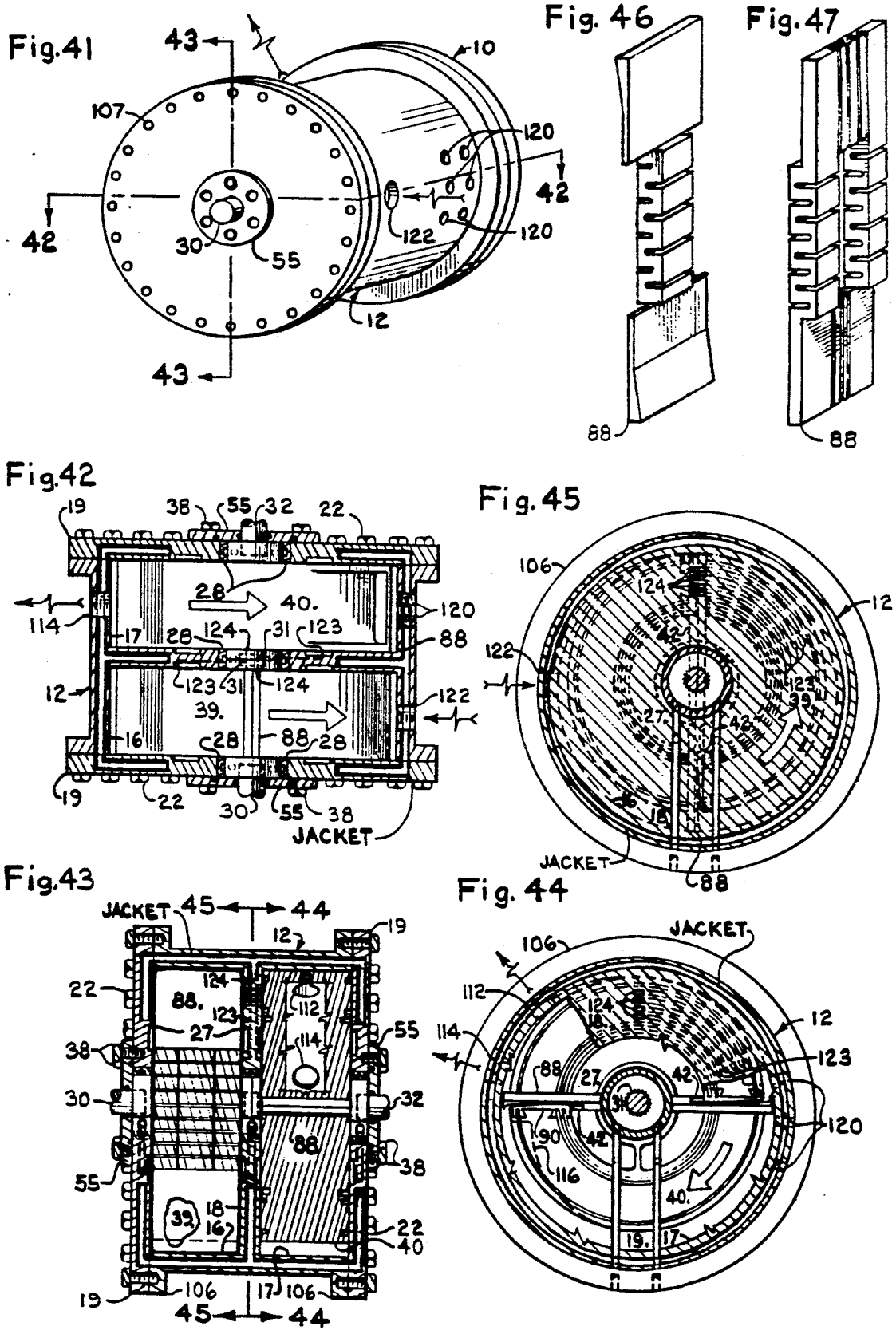

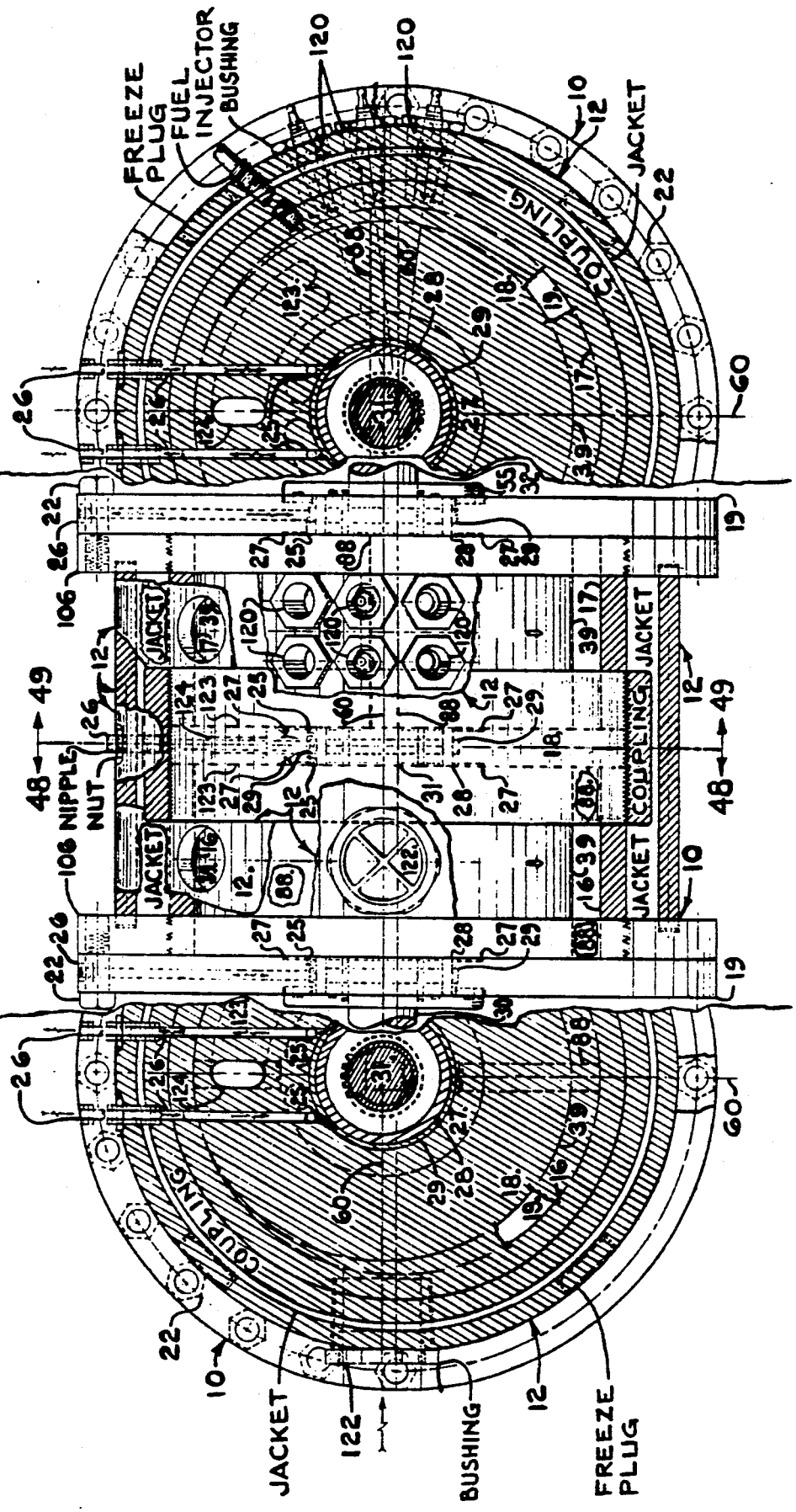

ROTARY VANE ENGINE

This invention comprises a novel and useful rotary vane (internal combustion) engine and generally relates to an (internal combustion) engine of a rotary vane type having internal supercharging means.

Although the present application discloses an internal combustion engine of the rotary vane type as an exemplary embodiment of the principles of the invention, it should be understood that some of the principles of the invention are equally applicable to rotary vane machines of other types, such as fluid pressure motors, steam engines, fluid pumps and the like. Briefly, the invention relates to a type of machine wherein a case essentially separated by a center plate results in having two generally cylindrical chambers therein receives two generally cylindrical rotors in the chambers; the rotors are interlocked or united within the center plate, revolve unidirectionally and are journalled for rotation about an axis which is eccentric to the axis of the chambers. Each rotor is provided with a diametrically single sliding vane which is continuously engaged with the peripheral and side walls of the chamber(s) of divided case so that during rotation of the rotor the two or three spaces between the vane constitutes a working crescented chamber which is variable in volume, pressure and temperature including quality of charge in process.

The primary object of this invention is to produce a rotary vane machine and particularly a rotary vane (internal combustion) engine which shall reduce to a minimum the number of moving parts and the number of components of the machine to provide a device which is capable of enduring long periods of operation with a minimum of cost, ware and maintenance including (approximately) half the weight and space for equal power of any reciprocating engine.

A further object of the invention is to provide an apparatus operating at a very high thermal and volumetric efficiency which is incorporated in the exceedingly long strokes achieved by each sweep of a vane within a rotor confined within each respective chamber, especially when combined engines are ganged in series to enable double, triple, quadruple, etc. performance and/or power.

Yet another object of the invention is to provide an apparatus in accordance with the foregoing objects which will when operating as a pump or motor, obtain a very high mechanical advantage in converting the rotation of the rotor(s) into power of a driven shaft; especially when torque is required.

An additional and very important object of the invention is to provide a rotary vane (internal combustion) engine in accordance with the preceding objects wherein a precompressor is integrally and efficiently driven as a rotary vane pump, providing an initial precompression of the air and/or fuel air (charge) in the front section; and continues to be transferred via slots in the center plate (before top dead center) and precede through port slots of center plate to slots in the center plate (after top dead center) in the rear section where the charge is delivered to the combustion/exhaustion (working) chamber of the engine.

Still another object of the invention is to provide an internal combustion engine in accordance with the preceding objects which will substantially reduce if not completely eliminate any possibility of blow-back, bucking, or reverse fire of the processed gases during any cycle or stage of operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

BRIEF DESCRIPTION OF THE DRAWINGS

FIG. 1 is an isometric view showing a suitable embodiment of apparatus particularly adapted for use as an internal combustion engine of the rotary vane type, the fuel (air) supply port (as indicated by arrow), three ignition device apertures with one of two discharges shown (as indicated by an arrow) therefrom;

FIG. 2 is a view in horizontal section taken upon an enlarged scale substantially upon the plane indicated by the section line 2—2 of FIG. 1 and showing the internal construction of the apparatus of FIG. 1 with the intake charge port (as indicated by arrow) including fuel (air) transfer slots and ports between front and rear chambers of center plate and one ignition device aperture of three and with one of two exhaust discharge ports as shown and indicated by an arrow.

FIG. 3 is a vertical longitudinal sectional view taken upon an enlarged scale substantially upon the plane indicated by section line 3—3 of FIG. 1, and showing further internal structural details of the internal construction of the apparatus; parts being shown in elevation and in breakthrough views of vane in front section showing rotor and of rear section showing rotor with exhaust ports including two splined shafts and sprocket imbedded in four rotor journals inside of 3 bearings in their plates.

FIGS. 4 and 5 are vertical transverse sectional views taken substantially upon the planes indicated by section lines 4—4 and 5—5 of FIG. 3, with parts being shown hidden and showing further details of the apparatus in breakthrough views. Continuous cross hatching was omitted within encircled periphery center plate area for sake of clarity, except apertures and reverse flow relief slots as shown.

FIG. 6 is a side view of the front rotor with phantom splined shaft and interlocking sprocket concealed inside journals including break showing parts of gas and oil seal slots and a key vane slot perpendicular to and within the vane slot also.

FIG. 7 is a partial isometric view showing opposite side of apparatus with exhaust ports and discharges (as indicated by arrows) from rear section of engine.

FIGS. 8 and 11 are isometric front views showing internal case with rotor and end plate removed, exposing center plate. It shows an oil slot and hidden oil lines including oil orifices, (fuel) air transfer slots and ports with a slotted oil journal bearing. Intake port and flanged holes are threaded.

FIGS. 9 and 11 are isometric rear views showing internal case with rotor and end plate removed, exposing center plate. It shows an oil slot and shares hidden oil lines as shown in FIGS. 8 and 11 including (fuel) air transfer ports that penetrate the center plate with the slotted oil journal bearing and oil orifices. The (fuel) air transfer slots are recessed (on both sides) in the center plate. Exhaust ports and bolt holes are threaded.

FIG. 10 is an orthographic internal view of an end plate showing bores, and oil slot and hidden oil lines including oil orifices with a slotted oil journal bearing, including a fluid seal slot. The (bolted) end plates are similar to center plate features, except for (fuel) air transfer slots and ports.

FIG. 11 shows an isometric detail of a center or end plates with oil slots, oil orifices and oil (supply and return) lines where rotor faces engage walls of center plate on both sides and on inside of each end plate wall as shown in FIGS. 2—5 and 10.

FIG. 12 is an isometric view of a rotor with its vane and key vanes removed and with (one of two optional) periphery recessed pocket(s) shown.

FIGS. 13 and 14 are enlarged orthographic end views of a sprocket and splined shafts, respectively shown.

FIG. 15 shows an enlarged inside isometric detail of a bored shaft cap with fluid seal slots and concentrically spaced bolt holes which will be fastened to threaded end plates.

FIGS. 16 and 17 are enlarged isometric details of key vanes and how they are associated with FIG. 18 vane as shown and how they fit into dove tail slots of rotors as shown in FIGS. 4, 5, 24 and 25, including rotor slot.

FIG. 18 is an isometric detail of the oscillating vane with (joggled) perimeter slot for mitered perimeter seal segment assembly including corrugated side seal springs as shown in succession in FIGS. 19 and 20.

FIGS. 19 and 20 are isometric details of the mitered perimeter seal segmented assembly consisting of tip, corner and joggled side seal parts with sandwiched in corrugated side seal springs as shown for final assembly with oscillating vane.

FIGS. 21, 22 and 23 are respective nearly semi-circle gas and oil rings, each complete with compression spring loading. Each arc is concentric as shown in enlarged detailed views.

FIGS. 24 and 25 show rotation of rotors and vane directions as viewed from case ends toward center plate and similar to views in FIGS. 8 and 9 except they are partial exaggerated details with rotor, vane, key vane, seals, springs and other integral parts included. It also shows chambers increase and decrease for both lubricant (oil) and (fuel) air charge with respect to position before and after top dead center in process of cycles of operation and as indicated by arrows for rotation of rotors and direction of vanes; including paths of (fuel) air charge as indicated by small arrows between front and rear chambers during compression transfer means. Partial oil pumping means is also observed.

FIG. 30-40 are successive diagrammatic modes of (four) separate machines connected in series for multi-ganging in order to accommodate desired selections of power and/or performance requirements with a preliminary selection of firing orders as scheduled, including a partial physical ganged series of machines as shown in side and end views.

FIGS. 41-64 show various features and details of the apparatus.

DESCRIPTION OF PREFERRED EMBODIMENT

Figure 26:
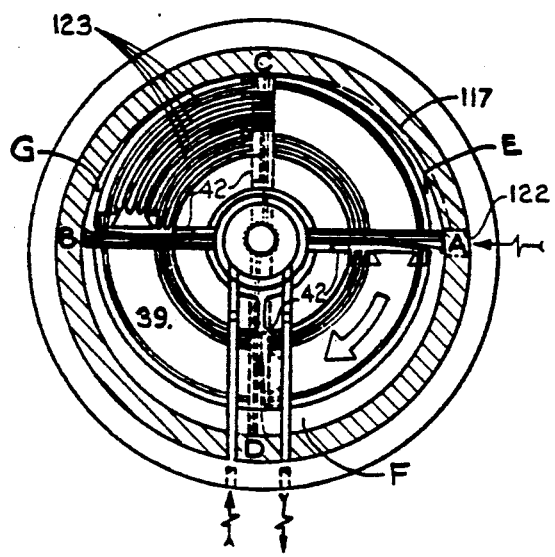
FIGS. 26-29 are successive diagrammatic views showing the positions of the apparatus during a complete sequence of operational cycles where everything is shown unidirectionally rotated and particularly where one of two sections are superimposed over the other, in FIGS. 26 and 27. Letters A, B, C, and D represent vane tip positions.

Designated generally by the numeral 10 in FIG. 1 is an apparatus incorporating the principles of this invention in the form of an internal combustion engine containing two rotary vanes. The machine or rotary vane engine 10 consists of a case of a generally cylindrical configuration indicated by the numeral 12 and which may be provided with any suitable means of support for mounting and not shown.

Referring now especially to FIGS. 2-5 it will be observed that the case 12 consists of a (dividing) center plate 18 with two (interior cylindrical) cases 16 and 17 which element is also shown in FIGS. 8 and 9 together with a pair of removeable end plates 19, shown in FIG. 10 and in detail FIG. 11 of its interior oil orifices 25, oil lines 26, oil slots 27 and bearings 28 with oil slot 29 and a slot 20 for fluid seal 59 and bolt circle holes 107 to receive hold down bolts 22 for fastening securely to each flange 106 of the case 12 by aligned threaded holes 108 in addition caps 55 in FIG. 15 are held down with bolts 38 in bolt holes 37 concentric to respective shafts and to bore 35 and threaded bolt holes 36 in end plates 19 where they are fastened securely. Caps 55 have shafts connected and extended from rotor journals 39 and 40 by means of splines 30 and 32 as shown (or by other means) in FIGS. 1-3, 6 and 12 extended through caps 55 to their respective accessory shaft 30 or drive shaft 32 as shown in FIGS. 2, 3 and 14 similarly the sprocket 31 in FIG. 13 may be used to unite and/or couple rotors back to back within journals 39 and 40 inside of bearing 28 of center plate 18 as shown; including their associated (fuel) air transfer slots 123 and with communicating (fuel) air transfer ports 124. The two shafts 30 and 32 protrude or extend beyond caps 55 (from front and rear engine sections) to be utilized for various engine accessories and power drive(s) not shown; caps 55 have fluid seals 50 and 58 to shafts and end plates.

In FIGS. 1, 2 and 3 caps 55 with end plates 19 may be integral therewith and which are provided with (suitable openings or) bores 34 (all aligned with a common center for all journals) therein provided with a usual static fluid tight seal 50 in cap slot 57 in which the shafts 30 and 32 extend, including static fluid tight seals 58 in slot 21 of caps 55 which bears against end plates 19. End plates 19 contain a circular slot 20 for a static fluid tight seal 59 that contacts flange 106 when hold down bolts 22 are securely fastened into threaded holes 107 in cylindrical configuration 12.

When the device is used as an internal combustion engine, the shaft section 32 comprises the drive shaft of the engine or the power output shaft therefore similarly it may serve as a steam engine, a fluid pressure motor or the like, the shaft 32 is the power output shaft. If the device is intended to function as a pump or compressor (in one or two stages) the shaft 32 may comprise the means by which power is applied to cause operation of the rotor and thus constitutes the power input shaft of the machine.

In consideration of FIGS. 2 through 12 inclusive and FIGS. 24 and 25 the cases 16 and 17 may have a reverse flow negative pressure relief slot 117 in front and a reverse flow positive pressure relief slot 118 in rear chambers occurring one after top dead center in the front section and one before top dead center in the rear section. This allows maximum (intake) volumetric efficiency and minimum (exhaust) back pressure. The rotors 39 and 40 as shown in FIGS. 4, 5, 6 and 12, with 21-25 contain near semi-annular slot segments that intersect with key vane 90 notches and rotor slot 41 for vane 88. The key vane and rotor dove tail slots slip fit and unite with semi annular ring slots 70, 71 and 72 to provide a unique sealing assembly for (fuel) air charge entrapment between outer ring seal segments 73 and 74 and oil entrapment of inner ring seal segments 75, including respective corrugated compression springs 78, 79 and 80. The gas ring segmented seals 73 and 74 ride on center plate 18 while stradling fuel air transfer slots 123 along with fuel air transfer ports 124 enabling desired compression during transmission of (fuel) air charge between front section chamber to rear section chamber as rotors with vanes rotate unidirectionaly and simultaneously at (approximately) 90° apart from one another. The oil ring segmented seals 75, rotate concentrically with gas rings 73 and 74 on both flat side faces of each rotor. These segmented rings provide fluid tight sealing between the rotating surfaces of the rotors 39 and 40 (and their plates 18 and 19) in a manner which will be readily apparent.

Conveniently the two end plates 19 are provided with apertured bores 34 and a corresponding bore 34 in the center plate 18 where all line up to receive respective bearings 28 with their oil slots 29 and oil lines 26 including oil orifices 25 and oil slots 27 for partial lubricating circuitry of this system within the confines of case 12 and end plates 19 and center plate 18. Direction of oil flow entry or exit is not indicated.

Reference is made next to the FIGS. 2, 3, 4, 5 and 6 in particular and with further reference to FIGS. 6 and 12 and 15 through 23 inclusive for a more detailed consideration of the structure of the rotors 39, 40 and the association of the perimeter vane sealing assembly 89 and key vane(s) 90 therewith. The diametrical slots 41 are shown rectangular in cross section (but needn't be) and project straight through the center of rotors 39 and 40, from circumference to circumference. These slots 41 also have perpendicular transverse slots that form the dovetail for each of two slidable fitting key vanes 90 installed there in displacing a portion of the (main) vane 88, including rotor vane slot 41 with remaining journals intact the vane 88 may have a perimeter (bi-joggled) slot 92 and may have a perimeter (bi-joggled) seal 89 composed of mitered segments of two side (joggled) seals, four corner seals and two tip seals complete with two mating side seal corrugated springs 100 for imparting perimeter compression between sides of vanes to center plate(s) 18 and end plate(s) 19 including periphery of chamber wall 16 (front section) and periphery of chamber wall 17 (rear section) thereby constituting two or three separate portions of a crescented volumetric chamber for one of each two sections. In addition, the rotors 39 and 40 with two key vanes 90 contain slots at both ends that line up with adjoining (near) semi annular gas ring slots 70 and 71 and oil ring slots 72 that receive respective seals 73, 74 and 75 including their concealed corrugated springs 78, 79 and 80, all of which form a fluid tight seal when joined together as shown in FIGS. 3, 4, 5, and 6; particularly when seals engage inner plate walls and chamber walls 16 and 17.

Shown in FIG. 3 is a partial view exposing part of two resilient corrugated springs 100 concealed in the sides of the (bi-joggled) slots 92 in the vane 88 where remainder of perimeter vane seal assembly 89 and resilient corrugated springs 100 are concealed in the sides of the (bi-joggled) slots 92 in the vane 88 are hidden by (bi-joggled slots of) vane 88. The entire perimeter seal assembly with corrugated springs 100 result in simultaneous forward, aft and radial forces and provides desired sealing as required for various divisions of crescented chamber volumes and pressures during sequent rotor and vane rotation. In a line of tangency (at top dead center) of rotors 39 or 40 and peripheral wall 16 or 17, a supplementary seal may be added to walls to ensure pressure retention and are not shown; any other desired sealing means may be required as deemed necessary also. Since varying volumes and pressures occur during engine's revolutions, the working chambers produce the different cycles of operation which are effected in the events of an internal combustion engine; the four successive operating strokes of intake, compression, (including compression transfer through center plate 18 via slots and ports between front and rear sections) combustion or firing on the power stroke and the exhausting stroke are thereby obtained.

As will be seen from FIG. 1 in particular, the end plates 19 are provided with bolt (hole) circles 107 to match threaded bolt holes 108 in flanged extremities 106 of attachment to casing 12 a shown in FIGS. 2 and 3. The fluid inlet port 122 for the machine (as signified by arrow) and by means of which a control unit for fuel injection (in front or rear section, a carburetor or other source of combustible mixture, not shown is connected thereto for supplying and introducing a combustible mixture into the machine. Similarly, the fluid outlet ports 112 and 114 of the machine (as signified by arrows) represents exhaust gases expelled from the engine (and could be discharged through an exhaust manifold or other means) as shown in FIGS. 2, 3, 4 and 7 also. It will be noted from FIGS. 4 and 5 that the vanes 88 in turn pass across their respective ports during rotor rotation and thus serve to open the first and last working chambers to enable the intake and exhaust ports with an oscillating slideable valving and is dependent on rotary vane sweeps to accomplish these two cyclic strokes.

The periphery of the rotors in each of the working crescented chambers, that are between each diametrical vane 88 are ninety degrees apart (more or less) and are provided with (optional) recesses 116 which extends circumferentially from the rotor center and is of gradually tapering depth as shown in FIGS. 2, 4, and 12. In as much as the surface of the rotor 40 substantially engages or contacts the surface(s) 16 or 17 of the (optional) recess 116 of rotor 40 in portion of crescented chamber at top dead center where rotor 40 and/or vane 88 become tangent to the surface(s) 16 or 17 serve to provide more volume into which the charge will have a reduction in pressure of the working chamber and result in lower octane or flash point requirements. Further, the configuration of this (optional) recess may further assist in producing the desired swirl or turbulence in the charged chamber during the compression stroke or phase. The flat plate area of recess 116 will be similar to a fixed or constant area to that of a piston or paddle which will increase power; it is supplementary to the variable vane area exposed to combustion or power stroke where the force of expansion of fired charge moves both of the flat plate areas radially and directly at subtended arcs with an exceedingly long stroke and leverage in the rear section of the engine; it does this twice for each revolution. Advanced, intermediate, retarded timing, dwell and controls of all sorts can be adapted for selection of the most desirable or efficient method of ignition, by ignition device and/or aperture 120 in order to completely burn each charge for maximum power. This engine can run with intermittent ignition or continuously with all ignition devices arcing or glowing or by compression/fuel injection means when so designed, including omission of distributor(s). Many ignition devices and/or apertures may be used for optimum ignition area coverage.

Reference is next made particularly to FIGS. 8, 9, 10, 24 and 25 where it will be seen that the inner (four) quadrant annular fuel air slots 123 and fuel air ports 124 are provided in (front section of engine with end plate 19 removed, exposing) center plate 18 of which the cylindrical cavity 16 houses a rotor 39 as shown in FIG. 6 and does not contain any recessed pockets however it may be a desirable future adaptation for volume gain. The rear section of engine with end plate 19 removed, exposing center plate 18 of which the cylindrical cavity 17 houses another rotor 40 as shown in FIG. 12 the inner partial annular recessed slots 123 and ports 124 are provided on opposite side of center plate 18 with full penetration of fuel air transfer ports 124 communicating between chambers of front and rear engine sections and as required for full fuel air charge (under compression) to pass through this momentary mechanical sliding vane valving from and to fuel air transfer slots 123 as shown on both sides of center plate 18. A complete description of this portion of the four cycle process will ensue in forthcoming diagrammatic information. In addition a primary and/or secondary oil pump may be also shared and becomes an integral part of the same rotary shuttle action (of each end of each vane in front and rear sections of engine) located within the annular concentric bounds of the oil slots 27 and mainly the opening and closing of the rectangular cavity oil slots 42 that acts as a combination "centrifugal piston oil pump" which draws oil in and discharges oil out within each revolution of the variable volumetric oil slot 42. The oil may be supplied by gravity or pressure of oil line 26 which feeds oil slot 27 via oil or orifice 25 but directly to oil slot 29 of bearing 28 for the rotors journal lubrication during each revolution. The oil enters supply oil line 26 after bottom dead center (where barrier or separation of oil slot 27 is tee connected with oil orifice 25) then continues to circulate as pumpage where it becomes discharged through the return oil orifice 25 and return oil line 26 before top dead center but after having lubricated the bearings, journals, rotors, vanes and vane perimeter seal assembly of front and rear (engine) sections, including innercases, and all moveable surface areas.

This engine lends itself to adequate cooling by liquid and/or air means since temperatures near circumferential areas need be treated by any conventional method as provided by radiators, pumps, hoses, jackets and fans or air cooling fins that may be incorporated for this system.

Figure 29:
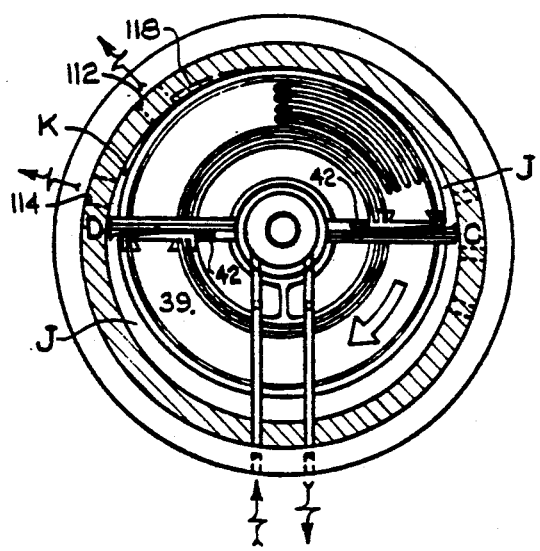
Figure 27:
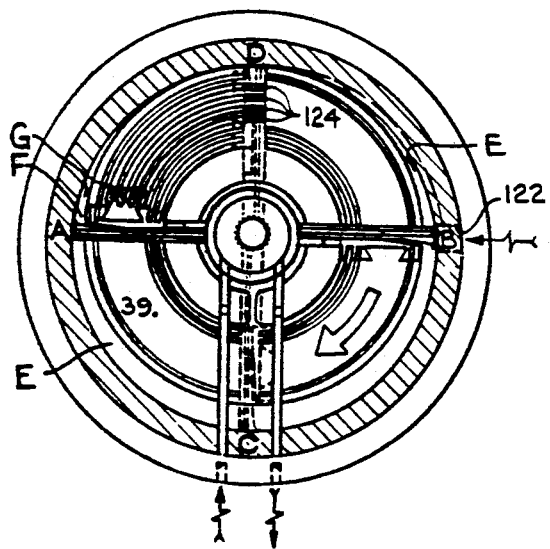
Figure 28:
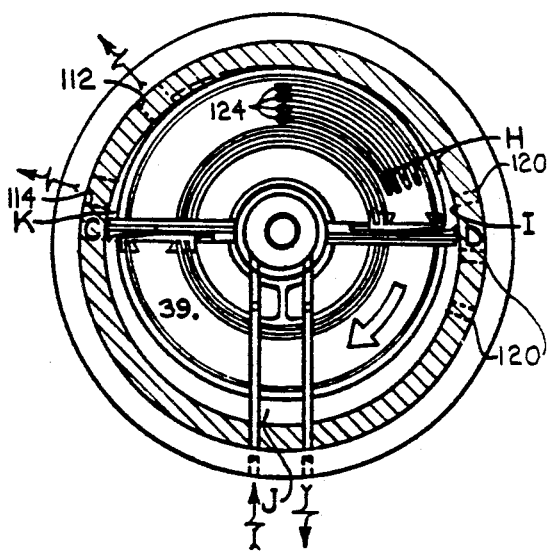
Figure 51:
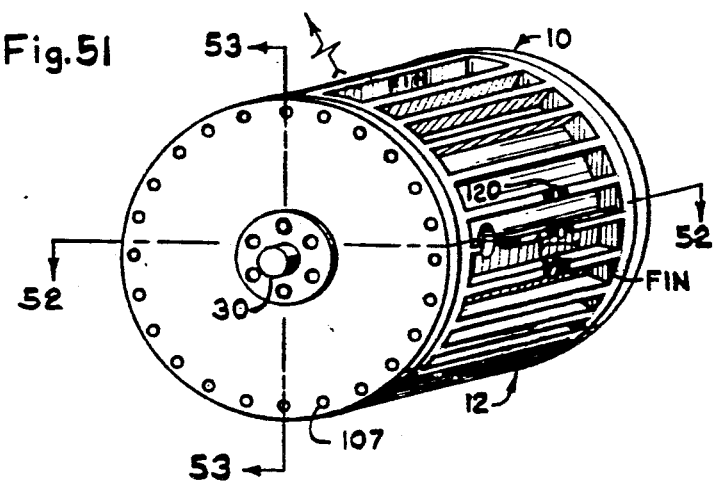

Attention is now given to diagrammatic views of FIGS. 26–29 for an understanding of the sequence of cycles of operation performed by this engine. In these Figures the two vanes are shown at A and B in front section with C and D hidden in rear section while the working chambers are divided into two or three segments each of a crescented configuration and each is identified by E, F, G, H, I, J and K respectively. Beginning first with the position of the parts as shown in FIG. 26, it will be observed that chamber E has a small intake charge, chamber F has a large intake charge and chamber G has a small compression charge, just before vane B unloads it into the rear section chamber via slots 123 and ports 124. Notice that vane C is located at top dead center ready for first firing of cycle in rear section but only after receiving the charge at a position beyond point(s) of ignition as shown in FIGS. 28 and 29 and after I and J respectively where expansion occurs well after top dead center.

In the next successive position shown in FIG. 27 it will be seen that a 180° rotation has been consummated. At this instant, the working chamber E has been filled with a trapped intake charge and the preceding trapped intake charge in working chamber F in FIG. 26 has moved into a compression position in FIG. 27 at F just before the vanes cross to intercept fuel air transfer slots allowing charge to transist from the small chamber at F to G where charge will be admitted to rear chamber through fuel air transfer slots and ports as vane A continues in clockwise rotation.

In the next successive position shown in FIG. 28 it will be seen that a 90° rotation was effected where the rotors in unison have completed three-quarters of a turn. Vane D has received the compressed fuel air charge from vane A where in reverse order via ports 124 and slots 123 with vane valving the fuel air charge H has begun ignition as shown where vane D has passed ignition point I. Preceding it is the end of power stroke J and exhaust stroke K.

In the last position of FIG. 29 another 180° of rotation transpires when charge in chambers J overlap where propulsive expansion occurs while flame front travels mainly in two directions from ignition point (s) 120 between top dead center and vane C and where preceding vane D is about to unload exhaust gases near end of power stroke J through exhaust ports 114 and 112 and finally as spent gases are then expelled from chamber K.

In the four stroke rotary vane engine as described; all four to six divisions of two crescented chambers are in various states of continuous, simultaneous action with very long overlapping strokes. It is also apparent that sliding vanes, key vanes and slots contribute in valving each charge before and after top dead center between front and rear sections of engine including oil pumping during rotor rotation with oscillating movements between vanes and key vanes as formerly stated and shown and where centrifugal/piston lubrication fluid circulates within engine complete from a supply and returns as also formerly stated and shown.

An elaborate intricate and articulate rotor and vane sealing system is provided to adequately ensure and maintain proper pressures throughout the four cycles of operation repeatedly; it is further apparent that variable vane area may be supplemented with an additional fixed flat plate (piston) area as provided at the opposing ends of rotor to augment more power where recessed pockets 116 are incorporated in the rotor(s).

It will be readily understood that with necessary minor adaptations the engine can be caused to operate upon the diesel cycle with fuel being injected for effecting ignition rather than producing ignition by the use of an igniter; in ignition of a previously introduced charge, while the intake port 122 will introduce a charge of fuel(air) or air into the working chambers is indicated by an arrow.

FIGS. 30–33 shows one separate rotary vane engine 10 in diagrammatic form in mode I, with an ensuing series of ganged engines of two, three and four, including a firing order schedule for each mode of engine size as indicated and example the rotary vane engine in mode I would fire 4 times in two revolutions and with two engines ganged together in mode II would fire 8 times in two revolutions, and so on as indicated by index numbers at vane tips that receive each power stroke in rear section of each engine. Both sections of engine are shown for each engine where the rear section is superimposed over the front section. Rotor 40 in rear section contains rotor index numbers 1, 2 with vane 88 shown in solid lines while front section contains another rotor with vane 88 shown in phantom lines hidden.

FIGS. 34-38 show a partial lower side view (with a common shaft centerline 60) depicting the modes of I-IV engines as combined and is intended to represent one rotary vane engine 10 or mode I but without any ganging as seen in FIG. 34, two rotary vane engines 10 or mode II represent the first ganged engine as seen in FIG. 35, three rotary vane engines 10 or mode III represent the second ganged engine as seen in FIG. 36, and four rotary vane engines 10 or mode IV represent the third ganged engine as seen in FIG. 37; it is shown complete with final rear section where gang rods 77, gang spacers 76 and gang nuts 56 are aligned and installed in sufficient numbers and equal spaces circumferentially to ensure a rigid amalgamated machine as embraced by FIG. 38 and is typical for modes II and III also.

Partial sectional elevations taken at front and rear of machines in 39 and 40 are shown in FIGS. 39 and 40 respectively and is typical for modes II, III and IV where end(s) of each rear section of modes are the same.

Further examples of adaptive use for this engine and others like it may be combined in parallel, series parallel and in other ways to enable a greater selection of power and performance when utilized as otherwise shown in FIGS. 30-40 inclusive.

Figure 56:
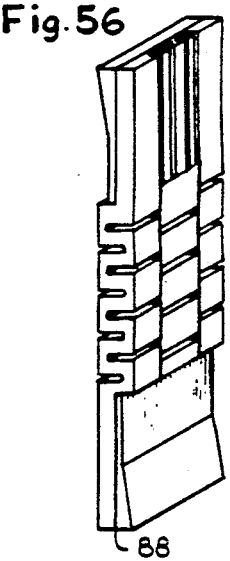
Figure 52:
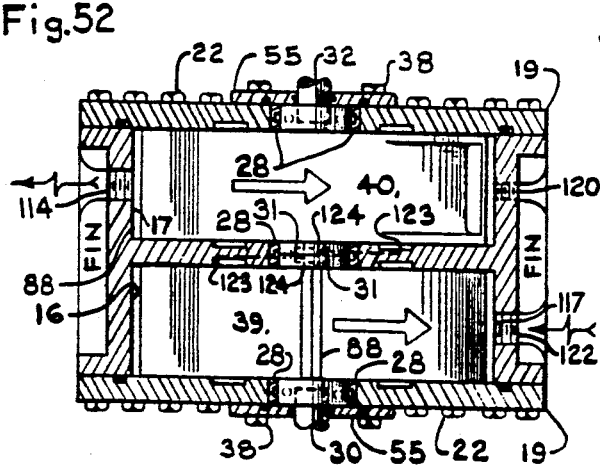
Figure 55:
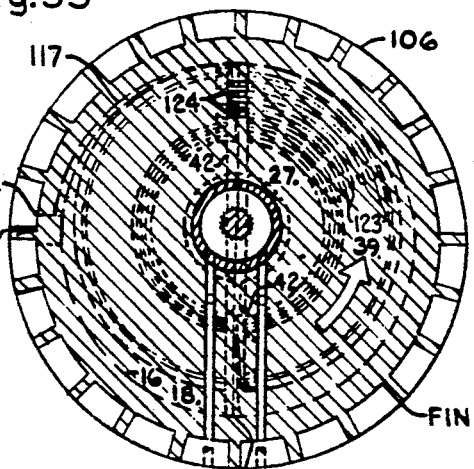
Figure 53:
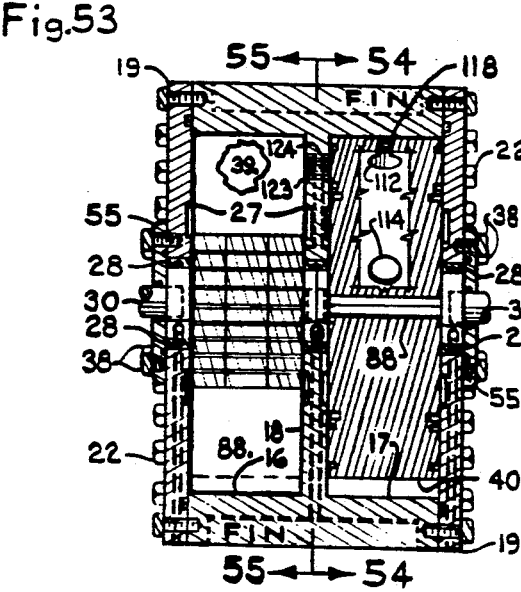
Figure 54:
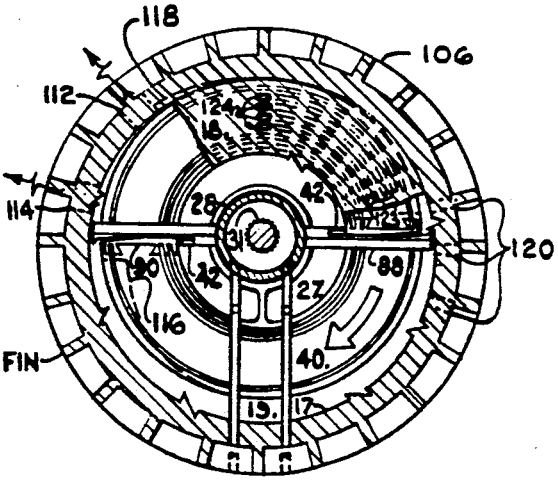
Figure 57:
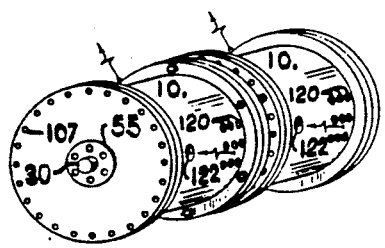
Figure 63:
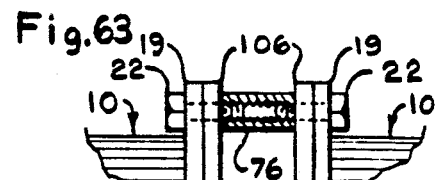
Figure 64:
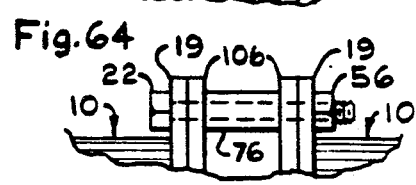
Figure 58:
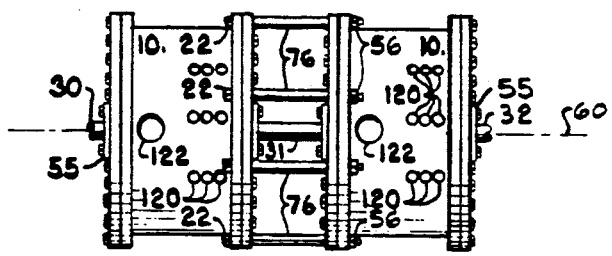
Figure 59:
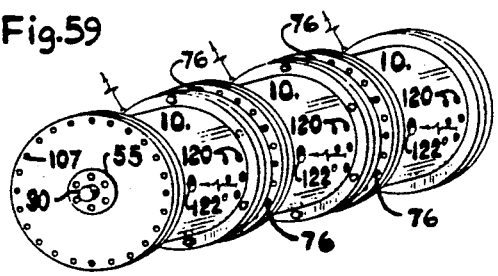
Figure 60:
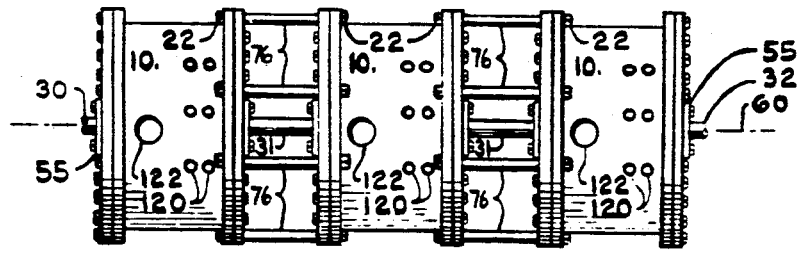
Figure 61:
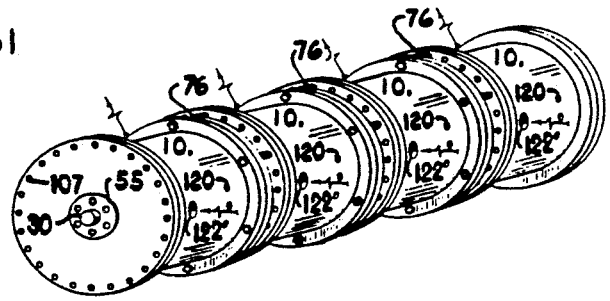
Figure 62:
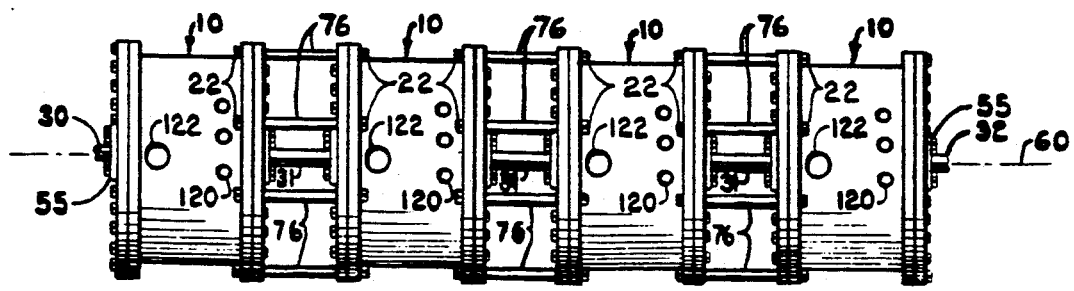

Emphasis of additional structural details with their features and arrangements for some rotary vane engines in FIGS. 41-45 shows coolant jackets and multi-grid pattern of ignition devices. FIGS. 46 and 47 shows separate halves of flexured vanes with grid slots and FIG. 56 shows both vane halves united. FIGS. 51-55 shows (cooling) fins and a single row of ignition devices. FIGS. 48-50 shows part of internal sectional views and a side view with assembled plumbing fittings that compose the structure of this machine, including fuel air charge circuit between crescented chambers from front to rear sections with slots and ports in center plate. Essentially FIG. 49 shows a fuel injector or fuel injectors positioned between or in line of ignition devices where injector stream or spray of fuel bounces off moving (heated) rotor resulting in dispersed atomization or fog where combustion occurs under compression, pressure and/or ignition. FIGS. 51-55 shows air cooling fins. FIGS. 57-62 shows additional detailed ganging arrangements including an additional multigrid pattern of ignition devices and methods by bolting ganged machines with various spacers in details of FIGS. 63-64.

With the foregoing and other objects in view the principles of the invention resides in the novel arrangement and combination of parts and in details of construction hereinafter described and claimed; and/or since numerous modifications and changes will readily occur to those skilled in the art, it is not desired to limit the invention to the exact construction and operation shown and described, and accordingly all suitable modifications and equivalents herein described or disclosed may be made within the scope (without departing from the disposition and content) of the invention as claimed.

What is claimed is:

1. A rotary vane engine comprising two cases having a peripheral wall, a dividing wall and two end walls with two rotors, rotably and eccentrically disposed therein to form two crescented working chambers, vanes slidably mounted in said rotors and projecting beyond each said rotor into continuous sealing engagement with all the internal walls of the two cases, a fluid inlet and exhaust port in the peripheral wall of said cases diametrically opposite and staggered with respect to one another for supplying and exhausting a fluid charge form said two crescented working chambers such that one of said two crescented working chambers is supplied with the fluid charge with the other of said two crescented working chambers exhausting the fluid charge, said center plate having a plurality of radially disposed arcuate transfer passages which are in fluid communication with said two crescented working chambers such that the fluid charge is periodically transferred from the one crescented working chamber to the other crescented working chamber; said two rotors rotably and eccentrically disposed to one another such that a trailing edge of one of the vanes of said one rotor draws the fluid charge through said fluid inlet and a leading edge of one of the vanes of said one rotor compresses the fluid charge via said plurality of radially disposed arcuate transfer passages in said center plate to a trailing edge of one of the vanes of said other rotor wherein the fluid charge is ignited by ignition means and expansion occurs until a leading edge of one of the vanes of said other rotor sweeps the fluid charge out of the exhaust port thus completing the engine's cycle, and means for lubricating the rotary vane engine wherein lubricating fluid is drawn in from a supply line to recessed circular slots centrally disposed in the dividing wall and the two end walls, said circular slots having a lubricating fluid inlet and outlet wherein the sweeping action of the rotor's vanes as well as centrifugal force serves to distribute the lubricating fluid along the inner walls of the two cases.

2. The rotary vane engine as set forth in claim 1 wherein the engine is liquid cooled.

3. The rotary vane engine as set forth in claim 1 wherein the engine is air cooled and the peripheral wall has cooling fins.

4. The rotary vane engine as set forth in claim 1 wherein said ignition means comprises several multigrid ignition devices.

* * * * *

UNITED STATES PATENT AND TRADEMARK OFFICE
CERTIFICATE OF CORRECTION

PATENT NO.   :   5,076,228
DATED        :   Dec. 31, 1991
INVENTOR(S)  :   Harlan Bowitz It is certified that error appears in the above-identified patent and that said Letters Patent is hereby corrected as shown below:

Column 8, line 64, between "and" and "example", add --where each engine performs a four cycle operation. As an--.

Signed and Sealed this

Eighteenth Day of May, 1993

Attest:

MICHAEL K. KIRK

Attesting Officer

Acting Commissioner of Patents and Trademarks